(12) United States Patent
Dunn et al.

(10) Patent No.: US 9,167,655 B2
(45) Date of Patent: *Oct. 20, 2015

(54) BACKLIGHT ADJUSTMENT SYSTEM

(71) Applicant: Manufacturing Resources International, Inc., Alpharetta, GA (US)

(72) Inventors: William Dunn, Alpharetta, GA (US); John Schuch, Buford, GA (US); David Williams, Canton, GA (US)

(73) Assignee: MANUFACTURING RESOURCES INTERNATIONAL, INC., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/709,045

(22) Filed: May 11, 2015

(65) Prior Publication Data
US 2015/0245443 A1    Aug. 27, 2015

Related U.S. Application Data (63) Continuation of application No. 14/447,164, filed on Jul. 30, 2014, now Pat. No. 9,030,129, which is a continuation of application No. 13/353,371, filed on Jan. 19, 2012, now Pat. No. 8,829,815, which is a continuation of application No. 12/124,741, filed on May 21, 2008, now Pat. No. 8,125,163.

(51) Int. Cl.
*H05B 37/02* (2006.01)
*G09G 3/36* (2006.01)
*H05B 33/08* (2006.01)

(52) U.S. Cl.
CPC ............ *H05B 33/0854* (2013.01); *H05B 37/02* (2013.01)

(58) Field of Classification Search
USPC ......... 315/149–159, 224, 291, 294, 307, 308, 315/309, 312; 345/102
See application file for complete search history.

(56) References Cited

U.S. PATENT DOCUMENTS

| | | | |
|---|---|---|---|
| 4,093,355 A | 6/1978 | Kaplit et al. | |
| 4,593,978 A | 6/1986 | Mourey et al. | |
| 4,634,225 A | 1/1987 | Haim et al. | |
| 5,029,982 A | 7/1991 | Nash | |
| 5,088,806 A | 2/1992 | McCartney et al. | |
| 5,247,374 A | 9/1993 | Terada | |
| 5,559,614 A | 9/1996 | Urbish et al. | |
| 5,748,269 A | 5/1998 | Harris et al. | |
| 5,767,489 A | 6/1998 | Ferrier | |
| 5,808,418 A | 9/1998 | Pitman | |

(Continued)

FOREIGN PATENT DOCUMENTS

| | | |
|---|---|---|
| JP | 03153212 | 7/1991 |
| JP | 11160727 | 6/1999 |

(Continued)

OTHER PUBLICATIONS

Zeef, Hubing, EMC analysis of 18' LCD Monitor, Aug. 2000, 1 page.

*Primary Examiner* — Tung X Le
(74) *Attorney, Agent, or Firm* — Standley Law Group LLP (57) ABSTRACT

A preferred embodiment relates to controlling the amount of backlight power in an electronic display to account for the temperature in the backlight cavity. Another embodiment relates to a system for controlling the amount of backlight based on both the temperature of the backlight and the amount of ambient light.

12 Claims, 6 Drawing Sheets

(56) References Cited

U.S. PATENT DOCUMENTS

| | | |
|---|---|---|
| 5,818,010 A | 10/1998 | McCann |
| 6,089,751 A | 7/2000 | Conover et al. |
| 6,157,432 A | 12/2000 | Helbing |
| 6,191,839 B1 | 2/2001 | Briley |
| 6,259,492 B1 | 7/2001 | Imoto |
| 6,417,900 B1 | 7/2002 | Shin et al. |
| 6,535,266 B1 | 3/2003 | Nemeth et al. |
| 6,628,355 B1 | 9/2003 | Takahara |
| 6,839,104 B2 | 1/2005 | Taniguchi et al. |
| 6,885,412 B2 | 4/2005 | Ohnishi et al. |
| 6,943,768 B2 | 9/2005 | Cavanaugh et al. |
| 7,330,002 B2 | 2/2008 | Joung |
| 7,474,294 B2 | 1/2009 | Lee |
| 7,595,785 B2 | 9/2009 | Jang |
| 7,692,621 B2 | 4/2010 | Song |
| 7,795,821 B2 | 9/2010 | Jun |
| 8,175,841 B2 | 5/2012 | Ooghe |
| 2002/0101553 A1 | 8/2002 | Enomoto et al. |
| 2002/0126248 A1 | 9/2002 | Yoshida |
| 2003/0007109 A1 | 1/2003 | Park |
| 2003/0230991 A1 | 12/2003 | Muthu |
| 2004/0036834 A1 | 2/2004 | Ohnishi et al. |
| 2004/0113044 A1 | 6/2004 | Ishiguchi |
| 2004/0165139 A1 | 8/2004 | Anderson et al. |
| 2006/0007107 A1* | 1/2006 | Ferguson ............ 345/102 |
| 2006/0022616 A1 | 2/2006 | Furukawa |
| 2007/0200513 A1 | 8/2007 | Ha |
| 2007/0268241 A1* | 11/2007 | Nitta et al. ............ 345/102 |
| 2007/0291198 A1 | 12/2007 | Shen |
| 2007/0297163 A1 | 12/2007 | Kim |
| 2008/0111958 A1 | 5/2008 | Kleverman |
| 2008/0136770 A1 | 6/2008 | Peker |
| 2008/0185976 A1 | 8/2008 | Dickey |
| 2008/0278099 A1 | 11/2008 | Bergfors |
| 2008/0303918 A1 | 12/2008 | Keithley |
| 2009/0033612 A1 | 2/2009 | Roberts |
| 2009/0104989 A1 | 4/2009 | Williams |
| 2009/0152445 A1 | 6/2009 | Gardner |

FOREIGN PATENT DOCUMENTS

| | | |
|---|---|---|
| JP | 2006145890 | 6/2006 |
| JP | 200803481 | 2/2008 |
| KR | 1020080000144 | 1/2008 |
| KR | 1020080013592 | 2/2008 |
| KR | 1020080086245 | 9/2008 |

* cited by examiner

BACKLIGHT ADJUSTMENT SYSTEM

CROSS-REFERENCE TO RELATED APPLICATIONS

This application is a continuation of and claims priority to U.S. application Ser. No. 14/447,164 filed on Jul. 30, 2014 now issued U.S. Pat. No. 9,030,129 which is a continuation of U.S. application Ser. No. 13/353,371 filed on Jan. 19, 2012 now issued U.S. Pat. No. 8,829,815 which is a continuation of U.S. application Ser. No. 12/124,741 filed on May 21, 2008 now issued U.S. Pat. No. 8,125,163, all of which are herein incorporated by reference in their entirety.

TECHNICAL FIELD

This invention generally relates to electronic display sensor systems and in particular to adjustable backlight systems for advanced electronic displays.

BACKGROUND OF THE ART

Traditionally, advanced electronic display systems have only been used for indoor applications, or outdoor applications where the variation in temperature and/or amount of direct sunlight is limited. When these systems are moved outside, both elements become significant factors in the display's ability to accurately recreate an image.

Cold is especially harmful to liquid crystal display (LCD) systems where the crystals can actually freeze. Heat is also harmful to many electronic displays as the electrical components which drive the display system may overheat and malfunction. Further, direct sunlight can limit the visibility of the display, as the reflection of the sun off of the viewing surface may be brighter than the light which is generated by the display. Direct sunlight can also heat the display, contributing to the overheating of electrical components or possible damage to liquid crystals in LCD applications.

SUMMARY OF THE INVENTION

Exemplary embodiments include a system and method for adjusting the backlighting on an electronic display based on temperature and luminance measurements. Electronic displays typically contain some type of light source in order to generate an image on the display screen. This light source is often referred to as the display's backlight. Sometimes, fluorescent bulbs may be used or more preferably, light emitting diodes (LED). A backlight system using LED's is disclosed in U.S. Pat. No. 7,052,152, herein incorporated by reference.

The amount of light that is required from a display backlight is dependent upon the amount of ambient light that is coming from the surrounding environment. For example, when the surrounding environment is very bright, a large amount of light is required from the backlight, as this light must overcome the bright light which is in the environment and is reflecting off the display surface. In contrast, when the surrounding environment is very dark, only a small amount of light is required from the backlight, as the display's light does not have to compete with a bright ambient light.

For indoor display applications, the variance is amount of backlight may be relatively low, as the amount of light inside a room may vary only a small amount. However, when electronic displays are used outdoors, the amount of ambient light can vary drastically. The ambient light that is surrounding the display can vary anywhere from completely dark at night, to being in direct sunlight during the day. These concerns are amplified for advanced displays which are designed to produce high quality, bright images with sharp contrast. Thus, in an exemplary embodiment the backlight of an electronic display is controlled, depending at least upon the amount of ambient light.

Some sources of backlighting degrade over time. For example, LED's may degrade over time and emit less light. Exemplary embodiments also allow for the brightness of a display to adjust based on the degradation of the light source.

Also for indoor applications, the temperature that an electronic display is subjected to will also vary only a small amount. Typically, these displays only see a range of temperatures near room temperature (ex. 65-75 degrees Fahrenheit). However, for outdoor applications, displays will see a very wide range of temperatures. These displays may see temperatures ranging from well below freezing to well over 100 degrees Fahrenheit.

The electronic display backlight is also a significant source of heat for the display. As mentioned above, too much heat or too little heat can also damage or destroy an electronic display. Again, this is especially a problem for large advanced displays, as these devices typically are required to produce bright, clear images. The amount of light that is required, typically forces the backlighting assembly to produce a large amount of light, which typically produces a large amount of heat. Thus, exemplary embodiments also control the level of the display backlighting based on the temperature of the air within the backlight cavity.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

Exemplary embodiments include a system and method for adjusting the backlighting on an electronic display based on temperature and luminance measurements.

Figure 1:
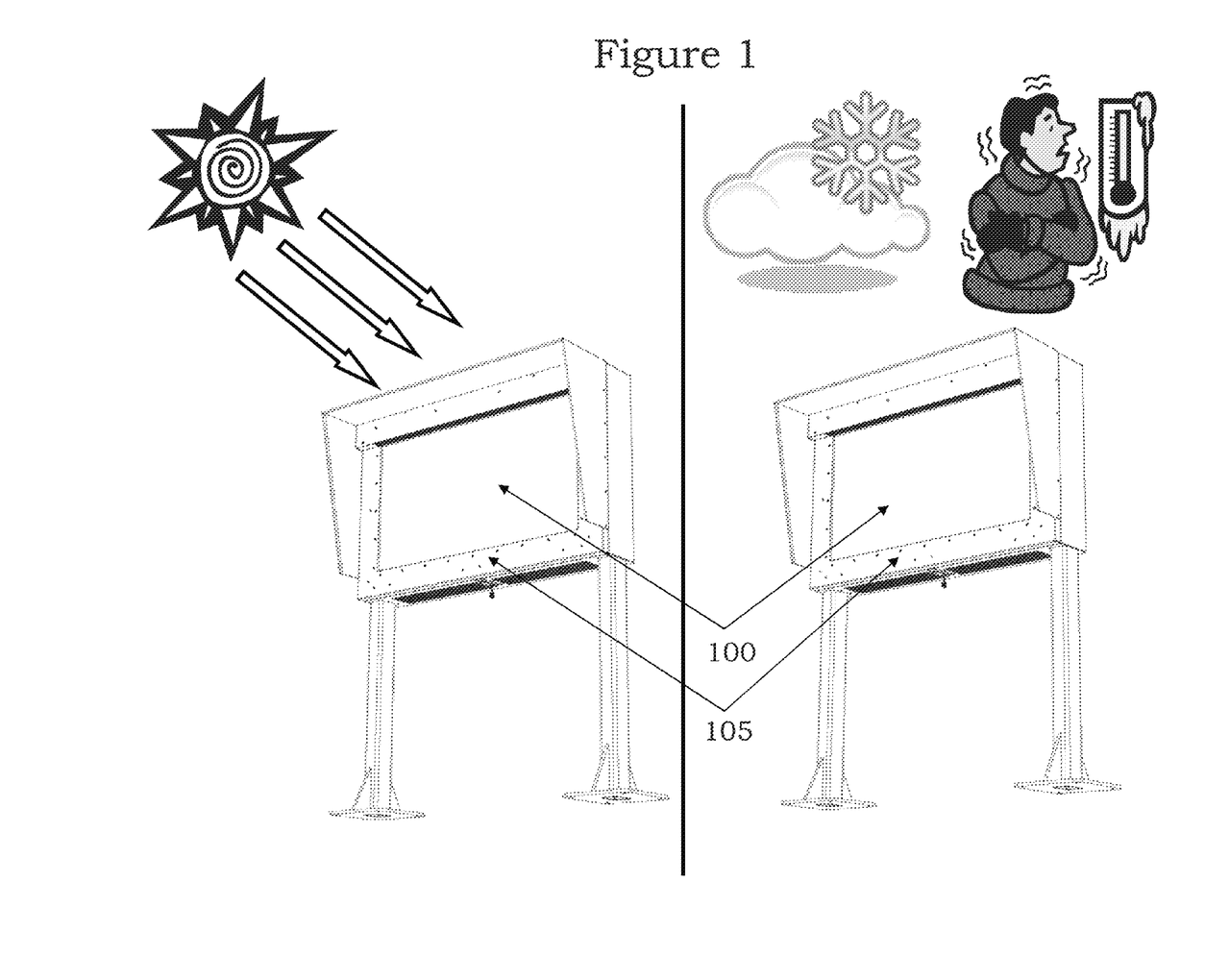
FIG. 1 is a perspective view of an exemplary electronic display.

FIG. 1 shows an exemplary outdoor display which could be subjected to high levels of both heat and cold. The viewing surface 100 is contained within the display housing 105.

Figure 2:
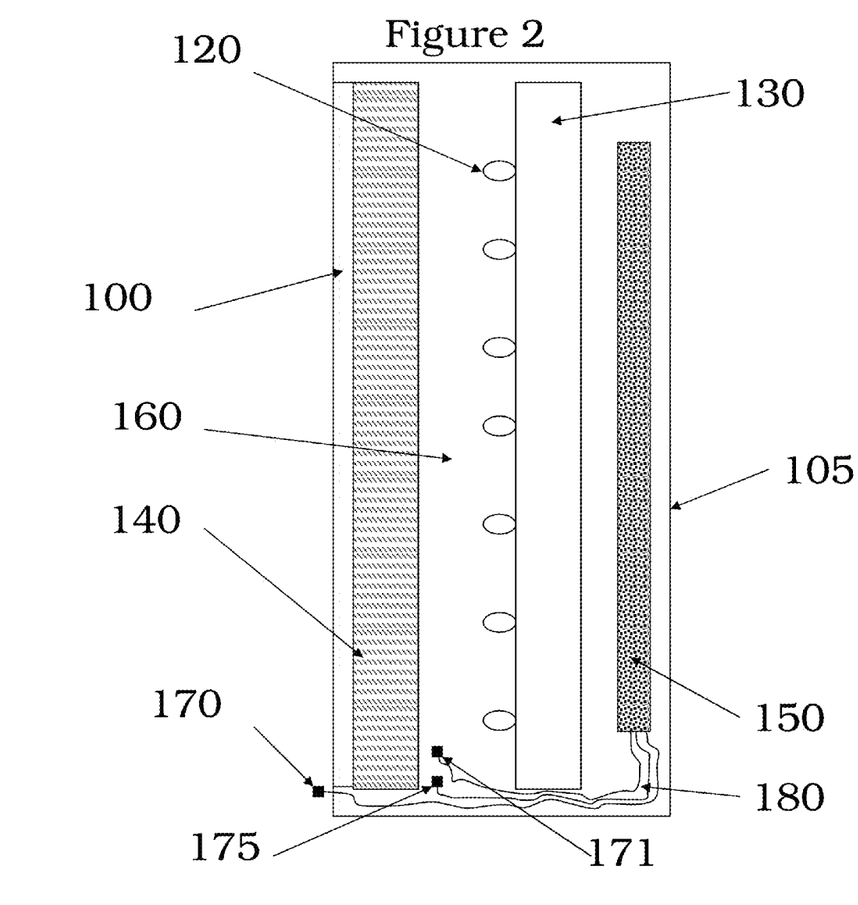
FIG. 2 is a side plan view of an exemplary embodiment showing components of the display system and the control system.

FIG. 2 shows further details about the electronic display and its associated components. The display housing 105 may contain all of the associated components. The viewing surface 100 is again found on the front of the display housing 105.

Towards the back of the display housing 105 is the electrical devices 150 which run the display. These devices may include: motors, circuit boards, resistors, capacitors, wiring, electronic chips, heating/cooling elements, fans, and power sources. In front of the electrical devices 150 is the backlight panel 130 and the backlight 120. In this exemplary embodiment, the backlight 120 comprises LED's, but any form of illumination will still fall within the scope of the invention. The backlight panel 130 provides a mounting surface for the LED's. The backlight panel 130 may also contain a highly reflective front surface so that the maximum amount of light from the LED's can pass through the viewing surface 100.

Between the backlight 120 and the viewing assembly 140 is the backlight cavity 160. The dimensions of the backlight cavity 160 is typically a function of the number of backlight LED's 120 and their luminance, size of the viewing surface 100, and the properties of the viewing assembly 140. The viewing assembly 140 may contain a variety of elements which are used to generate an image upon the viewing surface 100. In an LCD display for example, the viewing assembly 140 may contain a light diffuser, light reflector, several layers of polarizing glass, and a liquid crystal assembly. The precise elements and their arrangement will vary depending on the specific electronic display device being used and its particular application.

In an exemplary embodiment, an ambient light sensor 170 may be located outside of the display housing 105 and in front of, but not blocking the display surface 100. This ambient light sensor 170 measures the amount of light which is contacting the front surface of the display housing 105. Although shown at the base of the display in FIG. 2, the ambient light sensor 170 can be placed anywhere the sensor can measure the light contacting the front of the display housing 105, and near the display surface 100.

A backlight sensor 171 may be placed within the backlight cavity 160, and measures the amount of light which is luminating from the backlight 120. The backlight sensor 171 can be placed anywhere within the backlight cavity 160, but preferably should be oriented so that it does not block any significant amount of light from entering the viewing assembly 140.

Further in this exemplary embodiment, a temperature sensor 175 may be located within the backlight cavity 160. This temperature sensor 175 also can be located anywhere within the backlight cavity 160 or anywhere inside the display housing 105, but preferably should be oriented so that it does not block any significant amount of light from entering the viewing assembly 140. The wiring 180 for the three sensors is shown at the base of the display housing 105 and running back to the electronic devices 150. The wiring 180 can be oriented in a number of ways, with or without separate connectors, as is common for one skilled in the art.

Figure 3:
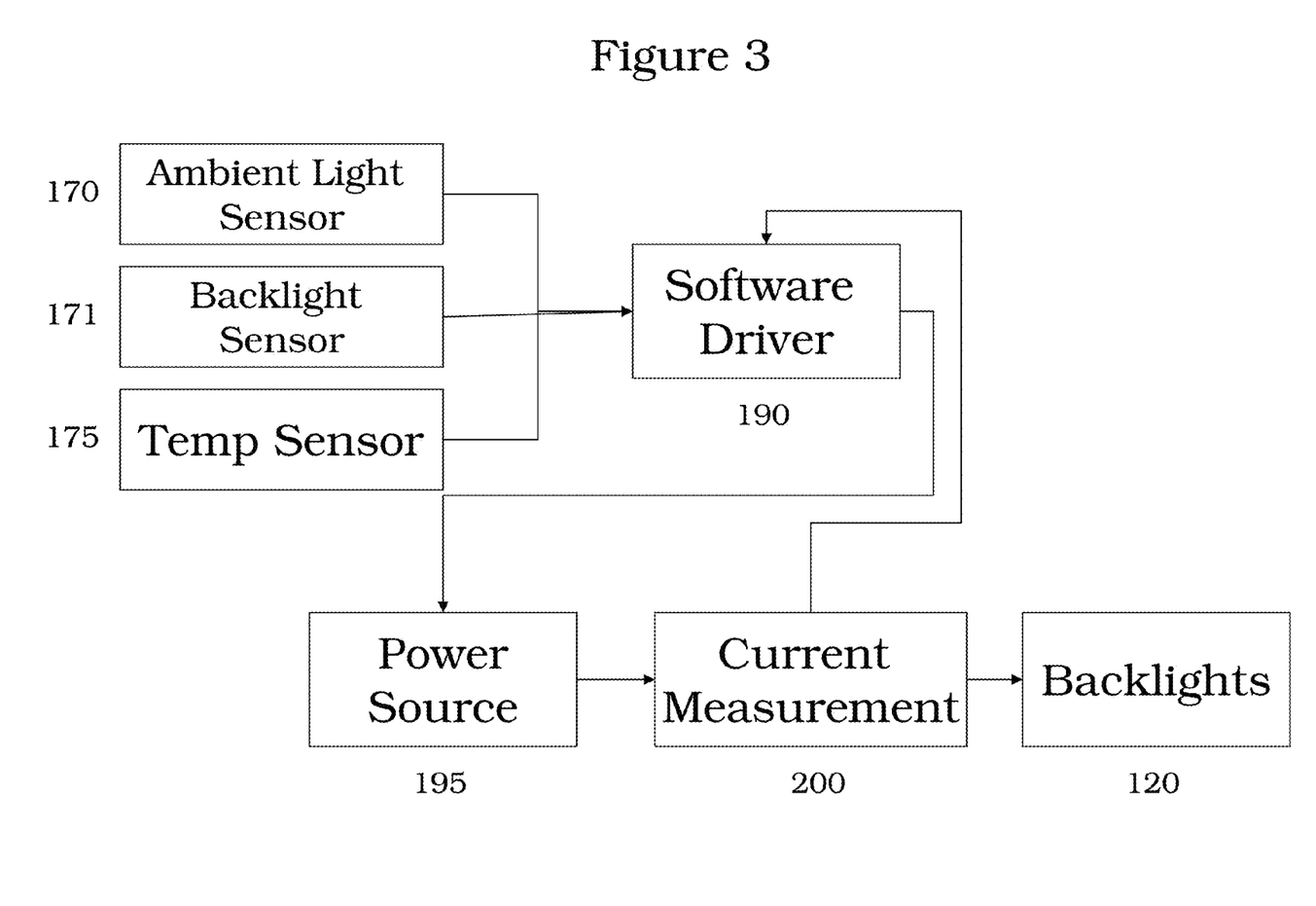
FIG. 3 is a flow chart showing the components for an exemplary embodiment of the control system.

FIG. 3 shows an exemplary embodiment with associated components and their connectivity. Data from the ambient light sensor 170, backlight sensor 171, and temperature sensor 175 flows into the software driver 190. The software driver 190 may be any commercially available control system or microcontroller. Preferably, the software driver 190 comprises an $e^2$prom (or eeprom), which is commercially available from Digi-Key (www.digi-key.com). The logic for the software driver is discussed below, under FIGS. 4A and 4B.

The software driver 190 decides how much power to send to the backlight 120. The software driver 190 sends the data regarding the proper amount of power to the power source 195, which generates the proper amount of power. A current measurement device 200 may be used to measure the amount of power coming from the power source 195. This information is sent back to the software driver 190 and compared to the power data which was originally sent to the power source 195 in order to ensure that the proper amount of power was in fact sent to the backlight 120. If these values do not match, adjustments are made by the software driver 190. Although this embodiment shows a current measurement device, any type of power measurement device will suffice.

Finally, the power is sent to the backlight 120, where the amount of light generated is again measured by the backlight sensor 171. The data from the backlight sensor 171 is again sent to the software driver 190, along with the data from the ambient light sensor 170 and the temperature sensor 175 as the process is repeated.

Figure 4A:
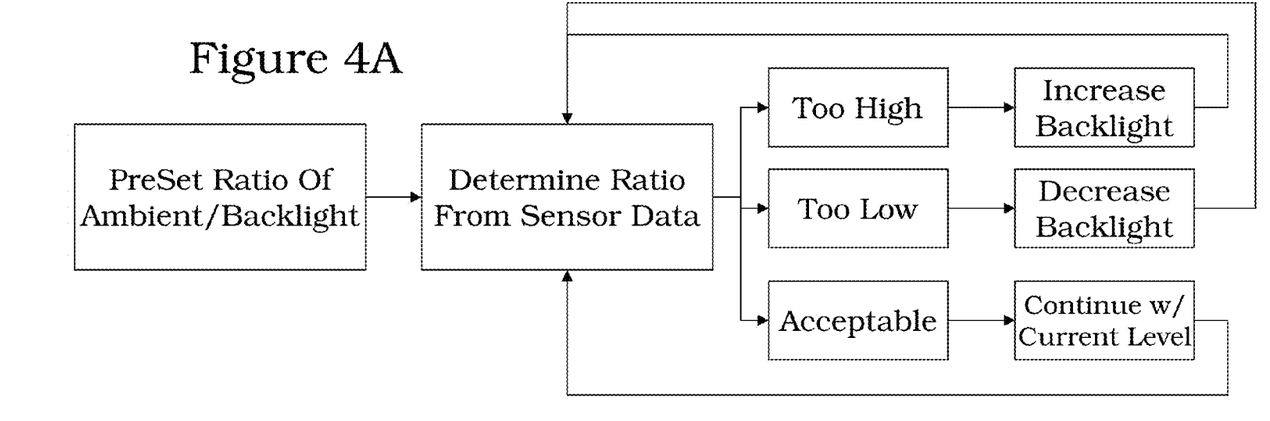
FIG. 4A is a flow chart showing the logic for controlling the amount of backlight based on the amount of ambient light.

FIG. 4A shows an exemplary embodiment for the logic contained in the software driver 190 for adjusting the backlight based on the amount of ambient light. Ideally, a preferred light ratio can be determined which compares the amount of light in the ambient surroundings with the amount of light being generated in the backlight cavity 160. For most applications, the amount of backlight will need to be greater than the amount of ambient light to ensure that the display can be seen. Preferably, the ratio of ambient light to backlight should be less than one. (ex. Ratio=ambient light/backlight). However, the precise ratio can vary depending on the particular display, environment, and application.

After a preferred light ratio is selected, it is stored within the software driver 190. The light ratio will also likely have an acceptable range, such that there is an ideal ratio with a certain amount of tolerance which allows the measured ratio to drift above or below the ideal ratio, before any action is taken by the system. The software driver 190 then reads the data from the light sensors and calculates the current light ratio. If the ratio is outside of the accepted tolerance range, then the system takes action. If the ratio is too low (i.e. there is too much backlight for the amount of ambient light), the backlight is decreased. If the ratio is too high, the backlight is increased. If the ratio is within the accepted tolerance, the current power to the backlight is continued.

Figure 4B:
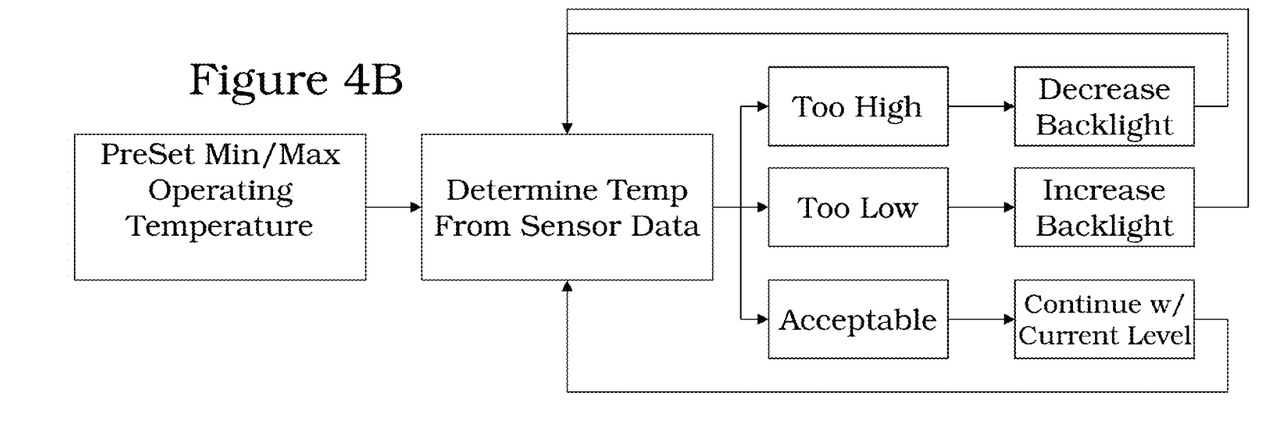
FIG. 4B is a flow chart showing the logic for controlling the amount of backlight based on the temperature in the backlight cavity.

FIG. 4B shows an exemplary embodiment for the logic contained in the software driver 190 for adjusting the backlight based on the temperature in the backlight cavity 160. A preferred operating temperature can be selected for the display, which will take into account the type of display, application, and its environment. This preferred operating temperature would again have a tolerance, where there is a minimum acceptable temperature along with a maximum acceptable temperature. The software driver 190 determines the current temperature from the temperature sensor 175 and compares this value to the preset min/max operating temperature. If the present value is below the minimum, the backlighting is increased to facilitate the warming of the display. If the present value is above the maximum, the backlighting is decreased to facilitate the cooling of the display. If the present value is within the acceptable range, the present amount of power to the backlighting will be continued.

Using the amount of backlighting to facilitate the warming or cooling of an electronic display is very useful in applications where the display is exposed to a wide range of temperatures, especially high levels of cold or heat. For example, in an outdoor application where the temperature of the ambient air becomes very warm (and subsequently warms the temperature of the air in the backlight cavity 160) the display may become damaged if it continues to run. In typical displays, a thermostat will simply turn the display off to allow it to cool. However, where a display is used as an advertisement tool or for displaying important information, turning off the display will result in a lack of communication of any images whatsoever. Exemplary embodiments allow the display to simply dim itself slightly, to allow the unit to cool while still providing some visible image (albeit not as bright, but still visible).

This function also aids in protecting a display when the ambient air becomes very cold (and subsequently cools the air in the backlight cavity 160). Exemplary embodiments allow the display to increase the amount of backlighting, which will typically produce more heat, and subsequently heat the dangerously cool display.

Figure 5:
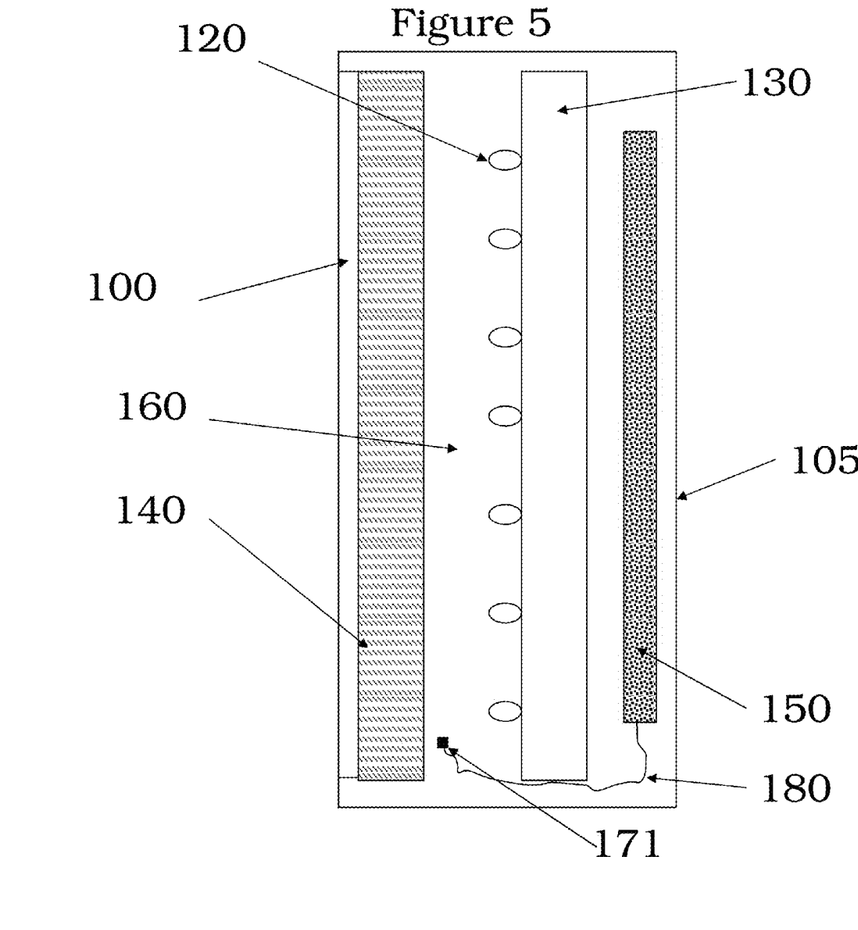
FIG. 5 is a side plan view of another embodiment where the amount of backlighting is not based on the ambient light.

The embodiments shown in FIGS. 2 and 3 allow the system to control the backlighting based on both the ambient light and the temperature in the backlight cavity. FIG. 5 shows another embodiment where the system controls the amount of backlighting based on the temperature in the backlight cavity, without regard to the amount of ambient light. This embodiment lacks the previous light sensors, but contains the temperature sensor 175.

Figure 6:
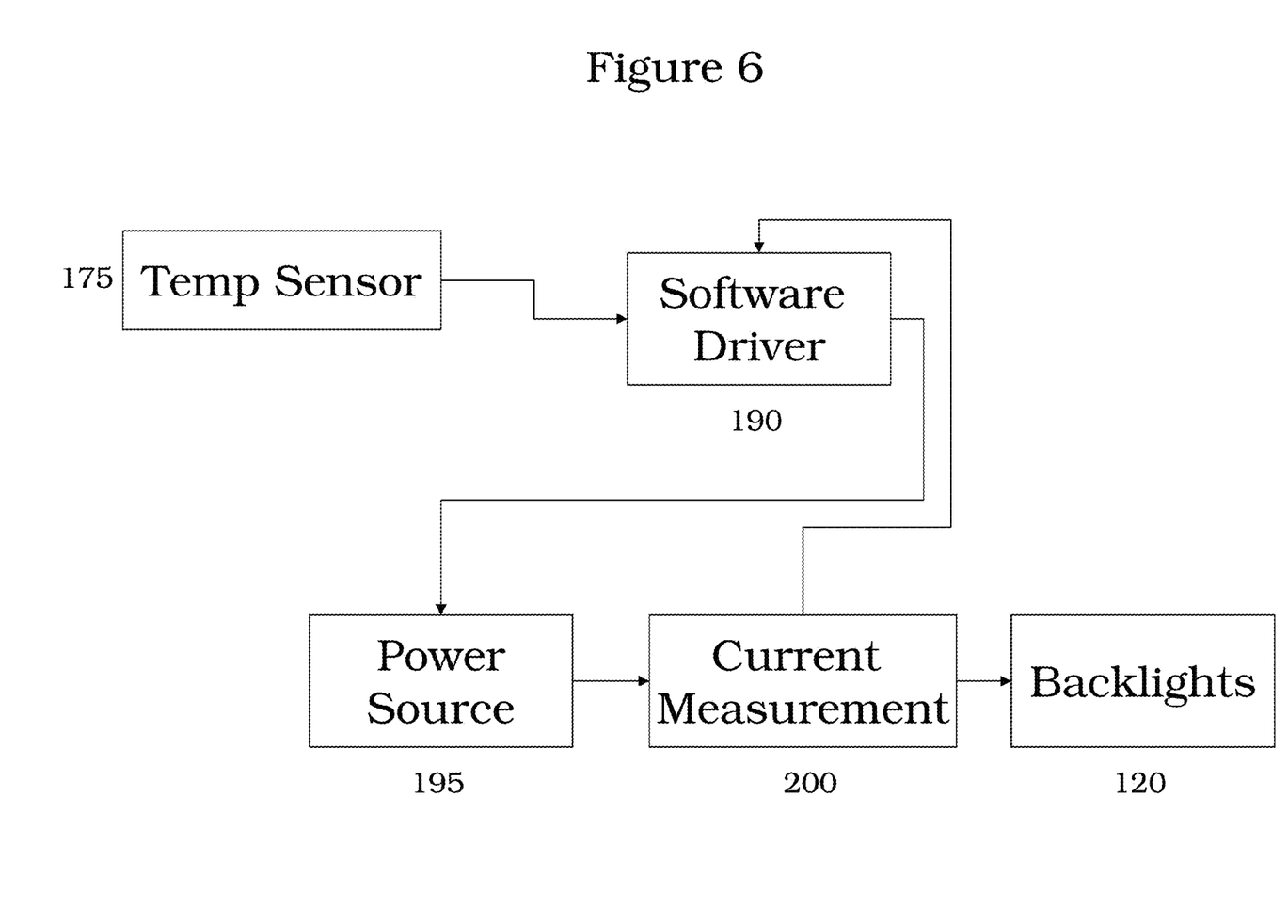
FIG. 6 is a flow chart showing the components for another embodiment where the amount of backlighting is not based on the ambient light.

FIG. 6 shows the various components for this embodiment, again lacking the light sensors but still containing the temp sensor 175, software driver 190, power source 195, current measurement 200 (optional), and backlight 120. As the embodiments in FIGS. 2 and 3 conduct the logic in both FIGS. 4A and 4B, the embodiments in FIGS. 5 and 6 would only conduct the logic in FIG. 4B.

It is to be understood that the spirit and scope of the disclosed embodiments are not limited to LCDs. By way of example and not by way of limitation, embodiments of the present invention may be used in conjunction with displays selected from among LCD (including TFT or STN type), light emitting diode (LED), organic light emitting diode (OLED), field emitting display (FED), and cathode ray tube (CRT). Furthermore, embodiments of the present invention may be used with displays of other types including those not yet discovered. In particular, it is contemplated that the present invention may be well suited for use with full color, flat panel advanced LCD displays. While the embodiments described herein are well suited for outdoor environments, they may also be appropriate for indoor applications (e.g., factory environments) where ambient light and thermal stability of the display may be at risk.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

What is claimed is:

1. A system for controlling the backlight of an electronic display, the system comprising:
   an electronic display with a viewing surface and a backlight;
   a power source operatively connected to said backlight;
   a first light sensor to measure ambient light;
   a second light sensor to measure light emitted by said backlight; and
   a software driver operatively connected to
      said first and second light sensors; and
      said power source; and
   wherein the software driver is adapted to
      receive a preferred amount of backlight illumination for a given amount of ambient light;
      increase the power of said power source when the amount of backlight illumination is too low for the amount of ambient light; and
      decrease the power of said power source when the amount of backlight illumination is too high for a given amount of ambient light.

2. The system of claim 1 further comprising a power measurement device operatively connected between said power source and said backlight and providing power data to said software driver.

3. The system of claim 1 wherein said software driver comprises an eeprom.

4. The system of claim 1, wherein the backlight comprises:
   a mounting element;
   a reflective element covering one surface of the mounting element; and
   one or more illuminating devices fixedly attached to the mounting element on the surface containing the reflective element.

5. The system of claim 4, wherein said mounting element comprises a printed circuit board.

6. The system of claim 4, wherein said one or more illuminating devices comprise any one of the following: LED's and fluorescent lights.

7. The system of claim 1 wherein said electronic display is a liquid crystal display.

8. A method for controlling the backlight in an electronic display device having a viewing surface and backlight, the steps comprising:
   setting a maximum operating temperature for said backlight;
   defining a preferred amount of backlight illumination for a given amount of ambient light;
   measuring the temperature of the backlight;
   measuring the amount of ambient light;
   calculating a current light ratio; and
   dimming the backlight slightly when the temperature of the backlight exceeds the operating temperature range or the amount of backlight illumination is too high for a given amount of ambient light.

9. The method of claim 8 further comprising the steps of:
   measuring the amount of light generated by the backlight;
   increasing the power to the backlight when the amount of backlight illumination is too low for the amount of ambient light.

10. A method for controlling the backlight in an electronic display device, the steps comprising:
    providing an electronic display device having a viewing surface and a backlight;
    providing a power source which sends power to the backlight;
    providing a temperature sensor to measure an actual operating temperature of said display device;
    providing a driver which is operatively in communication with said power source and said temperature sensor to send electrical signals to said power source;
    establishing a preferred operating temperature range for said display device; and
    providing said electrical signals to the power source to decrease the power to the backlight when said actual operating temperature exceeds said preferred operating temperature range until the actual operating temperature returns to within the operating temperature range.

11. The method of claim 10 further comprising the steps of:
    measuring the power sent from the power source to the backlight;

comparing the power measurement to the electrical signals from the driver; and modifying said electrical signals if said power measurement does not match said controlling signal.

12. The method of claim 10 further comprising the steps of:

measuring the amount of ambient light;

measuring the amount of light generated by the backlight;

defining a preferred amount of backlight illumination for a given amount of ambient light;

increasing the power of said power source when the amount of backlight illumination is too low for the amount of ambient light; and decreasing the power of said power source when the amount of backlight illumination is too high for a given amount of ambient light.

\* \* \* \* \*